US007802251B2

(12) United States Patent  (10) Patent No.: US 7,802,251 B2
Kitamura  (45) Date of Patent: Sep. 21, 2010

(54) SYSTEM FOR RESOURCE ALLOCATION TO AN ACTIVE VIRTUAL MACHINE USING SWITCH AND CONTROLLER TO ASSOCIATE RESOURCE GROUPS

(75) Inventor: Manabu Kitamura, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 1349 days.

(21) Appl. No.: 11/272,243

(22) Filed: Nov. 9, 2005

(65) Prior Publication Data
US 2007/0106992 A1 May 10, 2007

(51) Int. Cl.
G06F 9/455 (2006.01)
G06F 9/46 (2006.01)
(52) U.S. Cl. .......................................... 718/1; 718/104
(58) Field of Classification Search ................ 718/104, 718/1
See application file for complete search history.

(56) References Cited
U.S. PATENT DOCUMENTS 5,095,427 A * 3/1992 Tanaka et al. ................. 718/1
5,684,974 A * 11/1997 Onodera ....................... 711/202
6,463,504 B1 * 10/2002 Ishibashi et al. ............. 711/114
6,698,017 B1 * 2/2004 Adamovits et al. .......... 717/168
6,779,083 B2 8/2004 Ito et al.
7,055,014 B1 * 5/2006 Pawlowski et al. .......... 711/202
7,577,722 B1 * 8/2009 Khandekar et al. .......... 709/220
2002/0013802 A1 * 1/2002 Mori et al. ..................... 709/1
2002/0069335 A1 * 6/2002 Flylnn, Jr. ..................... 711/153
2002/0103889 A1 * 8/2002 Markson et al. ............. 709/223
2004/0025166 A1 * 2/2004 Adlung et al. ............... 719/310

* cited by examiner

Primary Examiner—Meng-Ai An
Assistant Examiner—Brian Chew
(74) Attorney, Agent, or Firm—Sughrue Mion, PLLC

(57) ABSTRACT

Computerized information system and method having multiple virtual machines share common resources such as the system storage resources. The system contains a host computer executing multiple virtual machines, system resources organized into multiple resource groups, and a resource controller associating a resource group with a virtual machine executing on the host computer. When a state of the virtual machine changes, the resource controller releases the previously allocated resource group and when a request to execute another virtual machine is received, a new resource group is allocated to the host computer.

27 Claims, 12 Drawing Sheets

| LDEV | Disk | RAID level | Stripe size |
|---|---|---|---|
| 0 | 1, 2, 3, 4 | 5 | 32KB |
| 1 | 5, 6, 7, 8 | 5 | 32KB |
| ⋮ | ⋮ | ⋮ | ⋮ |
| k | m, m+1 | 5 | 32KB |

Fig. 6

| HOST WWN | S_ID | VMID | ACTIVE | LUN | LDEV |
|---|---|---|---|---|---|
| 31:02:c2:60:35:01 | xxxxxx | 0 | 1 | 0 | 1 |
|  |  |  |  | 1 | 2 |
|  |  |  |  | ⋮ | ⋮ |
|  |  |  |  | K-1 | m |
|  |  | 1 | 0 | 0 | 1 |
|  |  |  |  | 1 | 8 |
|  |  |  |  | ⋮ | ⋮ |
|  |  |  |  | K-1 | n |
| 31:02:c2:26:44:04 | yyyyyy | 0 | 1 | 0 | 1 |
|  |  |  |  | 1 | 2 |
|  |  |  |  | ⋮ | ⋮ |
|  |  |  |  | K-1 | m |

| LDEV | WWN | LUN |
|---|---|---|
| 1 | 10:04:e2:04:48:39 | 0 |
| 2 | 10:04:e2:04:48:39 | 1 |
| ⋮ | ⋮ | ⋮ |

| VMID | LUN | LDEV |
|---|---|---|
| 0 | 0 | 1 |
| | 1 | 2 |
| | ⋮ | ⋮ |
| | K-1 | m |
| 1 | 0 | 1 |
| | 1 | 8 |
| | ⋮ | ⋮ |
| | L-1 | n |
| 2 | ⋮ | ⋮ |

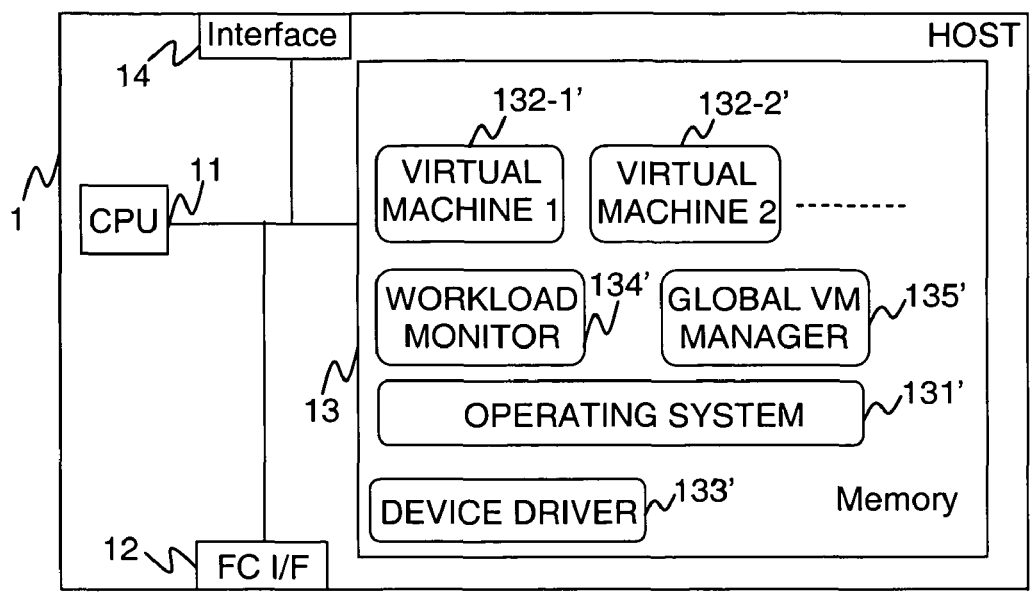

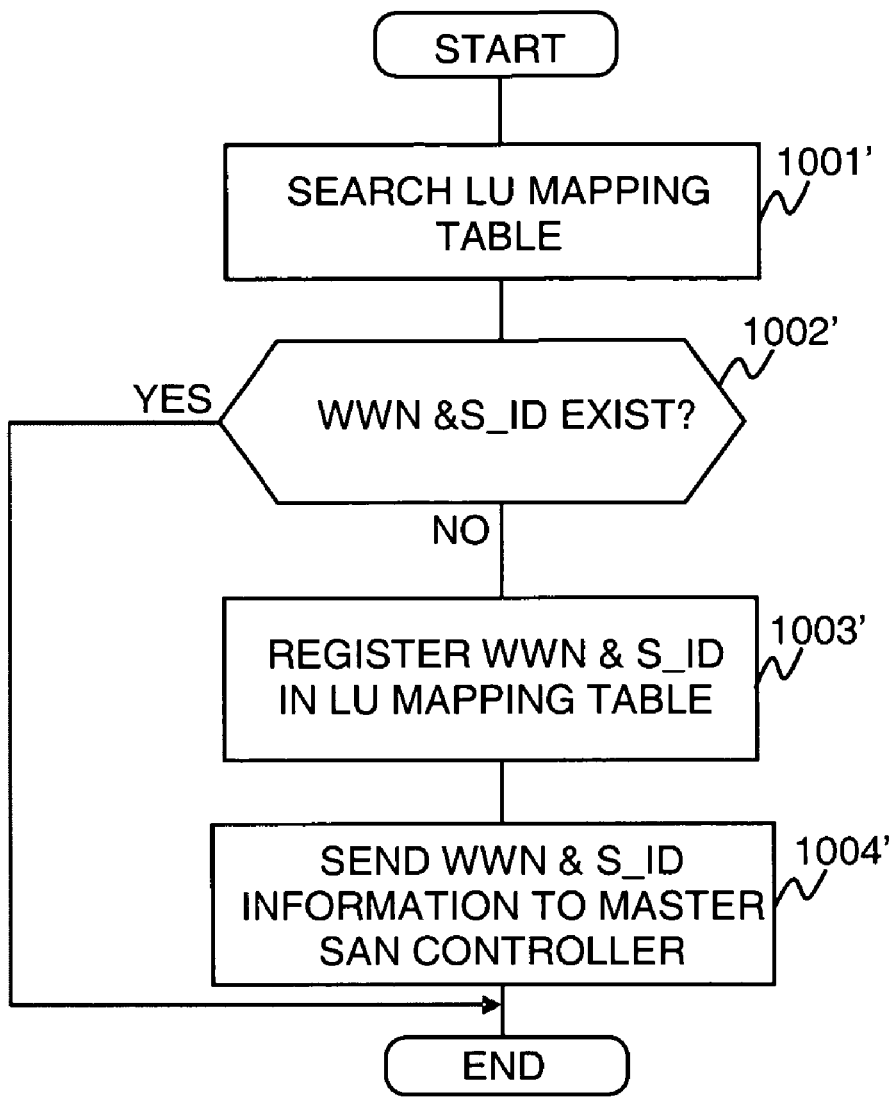

SYSTEM FOR RESOURCE ALLOCATION TO AN ACTIVE VIRTUAL MACHINE USING SWITCH AND CONTROLLER TO ASSOCIATE RESOURCE GROUPS

BACKGROUND OF THE INVENTION

1. Field of the Invention

The present invention generally relates to allocation of resources in a computer system, and more specifically to allocation of various computer resources in a virtual execution environment.

2. Description of the Related Art

Modern computer systems make extensive use of virtual execution environments also called "virtual machines." In general terms, a virtual machine is software that creates an environment between the computer platform and the end user in which the end user can operate software.

For example, the concept of virtual machine may be used to create a number of different identical execution environments on a single computer, each of which exactly emulates the host computer. This provides each user with the illusion of having an entire computer, but one that is their "private" machine, isolated from other users, all on a single physical machine. In another example, virtual machines may be used to isolate the application being used by the user from the computer. Because versions of the virtual machine are written for various computer platforms, any application written for the virtual machine can be operated on any of the platforms, instead of having to produce separate versions of the application for each computer and operating system. Additionally, because a virtual execution environment has no contact with the operating system or with other virtual execution environments, there is little possibility of an application executing in one such environment damaging other files or applications.

To preserve the aforementioned logical separation of different virtual executions environments, each virtual machine must be provided with its own logical storage resource. If, for instance, 10,000 virtual machines are being executed in a host computer and each virtual machine requires a storage device (a logical storage unit), then 10,000 logical storage devices must be provided i.e., one storage device (logical unit) for each virtual machine.

In the widely deployed Fibre Channel storage connectivity interface, theoretically, more than one million logical storage units can be connected to a host computer. In reality, however, many of the existing implementations of the Fibre Channel host bus adapters (HBA) and the associated device driver software are able to accommodate only between 100 and 200 logical storage units. As a result, in practice, only between 100 and 200 logical storage units may be connected to the host computer. Consequently, even if a large number of virtual machines can be configured to execute on the same computer hardware, the required separate storage devices may not be available to each running virtual machine. Because each virtual machine requires a separate storage area (logical unit), this in turn limits the number of virtual machines that may be executed by a single computer.

U.S. Pat. No. 6,779,083 to Ito et al., incorporated herein by reference, describes a method for enabling access to logical storage devices (units) from a specified group of host computers. In accordance with the described method, each host computer is assigned a unique identifier of the Fibre Channel HBA such as WWN (World Wide Name). Based on this identifier, the described system is able to determine, which host computer accesses each of the logical units. This method, however, is not applicable to an architecture, wherein a single host computer executes multiple virtual machines. Specifically, this method cannot be used in the context of virtualization environment of a single computer because the data access requests to the storage system from all virtual machines come with the same WWN information i.e., the WWN of the host computer.

What is needed is a system that would permit a single host computer to execute a desired number of virtual machines, without constraints due to design limitations of various system components such as the Fibre Channel HBA as well as its accompanying device driver software.

SUMMARY OF THE INVENTION

One of the aspects of the present invention is a system and method for assigning storage devices/logical units to virtual machines on demand, to allow a large number of virtual machines to execute on the same host computer.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

Accordingly to an exemplary, non-limiting formulation of the present invention a system for allocating resources in a virtual execution environment is provided. The system includes a host computer operable to execute a plurality of virtual machines; system resources comprising a plurality of resource groups; and a resource controller operable to associate a resource group of the plurality of resource groups to a virtual machine executing on the host computer. When a state of the virtual machine changes, the resource controller releases the allocated resource group.

Accordingly to yet another exemplary, non-limiting formulation of the present invention, a system for allocating resources in a virtual environment is provided. The system includes a host computer executing a plurality of virtual machines in a time-sharing manner; a storage device; and a controller. The controller is configured to divide the storage device into a plurality of logical storage areas, and, upon switching of a virtual machine to an active state, assigning at least one of the plurality of logical storage area to the virtual machine. When the state of the virtual machine becomes inactive, the controller releases the logical storage area assigned to the virtual machine.

Accordingly to yet another exemplary, non-limiting formulation of the present invention, a system for allocating resources in a virtual environment is provided. The system includes a plurality of host computers operable to execute a plurality of virtual machines. Each of the host computers executes the plurality of virtual machines in a time-sharing manner. The system further includes a storage device divided into a plurality of logical storage areas; and a controller. The controller is operable to assign a logical storage area to a virtual machine being executed by the host computer and manage the assignment via a mapping table. When a virtual machine becomes inactive, the controller releases the logical storage area assigned to the virtual machine.

Accordingly to another exemplary, non-limiting formulation of the present invention, a method for allocating resources in a virtual execution environment is provided. The method includes the host computer executing a first virtual machine and requesting to switch to executing a second virtual machine. The method further includes the resource controller releasing a resource group assigned to the first virtual machine and assigning a second resource group to the second virtual machine.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 6 illustrates the structure of a mapping table that maps storage devices to the virtual machines of various computer hosts according to an exemplary embodiment of the present invention.

FIG. 13 illustrates a structure of a logical unit (LU) mapping table according to another exemplary embodiment of the present invention.

FIG. 14 is a block diagram of a host computer according to another exemplary embodiment of the present invention.

FIG. 15 illustrates a structure of a logical unit (LU) mapping table after execution of an initial PLOGI process according to an exemplary embodiment of the present invention.

FIG. 16 shows a flow chart illustrating operation sequence of a PLOGI process according to an exemplary embodiment of the present invention.

DETAILED DESCRIPTION OF ILLUSTRATIVE, NON-LIMITING EMBODIMENTS

In the following detailed description, reference will be made to the accompanying drawing(s), in which identical functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

An exemplary embodiment of the inventive system includes a storage system and a host computer hardware. The host computer executes multiple virtual machines in a time-sharing manner. The storage system includes a storage controller coupled to a set of storage devices (logical units). The storage controller groups the attached logical storage units into several device groups. Each such device group is assigned to one of the multiple virtual machines, which execute in the host computer connected to the storage system.

In a single CPU environment, at each point in time, only one virtual machine executes on the host computer hardware. This is accomplished by sharing processor time among multiple virtual machines with each virtual machine receiving its portion of CPU time under control of a virtual machine monitor software. Therefore, in the host computer with a single CPU, each virtual machine executes in a time-sharing manner. On the other hand, an embodiment of the host computer system containing more than one CPU is capable of executing multiple virtual machines simultaneously.

Similar to the CPU sharing, the virtual machines executing in the inventive system are also capable of sharing the system storage resources. Specifically, when a first virtual machine is executed, the storage system assigns a first group of logical units to the host computer. These assigned units are used by the first virtual machine executing on the host computer at the time of the storage units assignment.

When the first virtual machine stops executing and the second virtual machine begins its execution cycle, an embodiment of the inventive storage management system releases the assignment of the first group of logical units and assigns a second group of logical units to the host computer.

Figure 1:
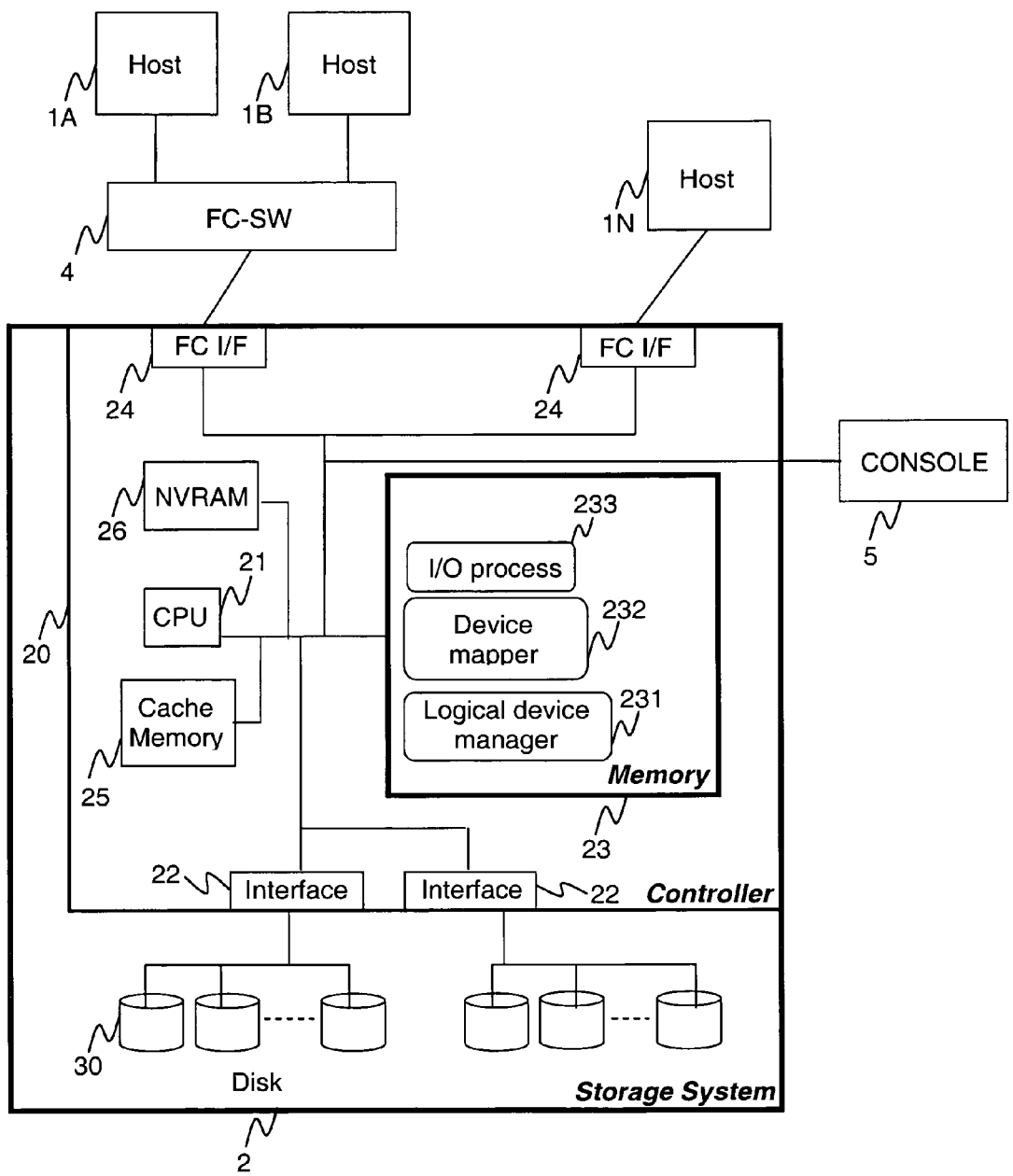
FIG. 1 is a block diagram illustrating the structure of information system according to an exemplary embodiment of the present invention.

FIG. 1 depicts an exemplary block diagram illustrating a computerized information system according to an exemplary embodiment of the inventive concept. The exemplary information system depicted in FIG. 1 contains a storage system 2 coupled to one or more host computers 1A, 1B . . . 1N, which hereinafter are also referred to as "hosts". The hosts 1A . . . N may be connected to the storage system 2 using a variety of means. For example, one or more of the hosts 1A . . . 1N may be directly connected to the storage system 2 using a Fibre Channel interface cable (e.g., host 1N is directly connected to the storage system 2) and one or more of the hosts 1A . . . N may be connected to the storage system 2 via a Fibre Channel switch (FC-SW) 4 (e.g., hosts 1A and 1B are connected via FC-SW 4).

Additionally, in the embodiment of the system shown in FIG. 1, a console 5 is provided to enable management the storage system 2 by a system administrator. The exemplary console 5 depicted in FIG. 1 is connected to the storage system 2 using any known suitable interconnect and facilitates the management of the inventive storage system.

Figures 2, 3:
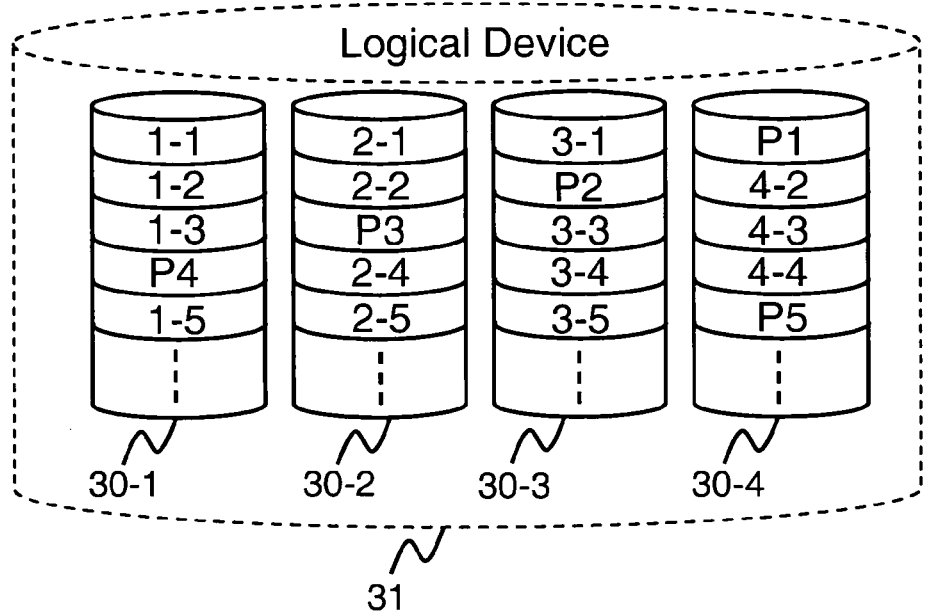
FIG. 2 is a block diagram illustrating a logical device according to an exemplary embodiment of the present invention.
FIG. 3 illustrates the structure of the RAID configuration level table a according to an exemplary embodiment of the present invention.

The storage system 2 includes a disk controller 20 attached to a set of physical disks 30. The disk controller 20 is configured with proper software and/or hardware to manage the physical devices attached thereto, for example the physical disks 30 shown in FIG. 1. In addition to managing the aforementioned physical disks 30, the disk controller 20 also manages logical storage devices, which it allocates from the storage area available on the physical disks 30. FIG. 2 is a block diagram illustrating a logical device according to an exemplary embodiment of the inventive concept. The exemplary logical device depicted in FIG. 2 is composed of four physical storage devices (disks) 30, and, specifically, disks 30-1, 30-2, 30-3, and 30-4. Each such disk is logically partitioned into regions called stripes. A stripe is a predetermined linear region of a disk block, with the corresponding length stored in the RAID configuration table of FIG. 4, described in detail below. For example, in the logical device depicted in FIG. 3, each disk (30-1 . . . 30-4) is segmented into multiple stripes, with disk 30-1 having stripes 1-1, 1-2, 1-3, P4, 1-5, and so on; disk 30-2 having stripes 2-1, 2-2, P3, 2-4, 2-5, and so on; disk 30-3 having stripes 3-1, P2, 3-3, 3-4, 3-5, and so on; and disk 30-4 having stripes P1, 4-2, 4-3, 4-4, P5, and so on. Stripes designated by P1, P2, . . . , P5 are parity stripes used for storing the parity error detection/correction data of the corresponding stripes. The disk controller 20 manages the disks 30 including the segmentation of the physical disks 30 into various stripes.

The disk controller 20 depicted in FIG. 1 contains a Central Processing Unit (CPU) 21, one or more backend interfaces 22, a memory 23, one or more Fibre Channel interfaces (FC I/F) 24, a cache memory 25, and a Non-Volatile Random Access Memory (NVRAM) 26. In the shown exemplary embodiment, the NVRAM 26 is a battery-powered non-volatile memory. The backend interface 22 connects the controller 20 to the physical disks 30, while the FC I/F 24 connects the controller to the hosts 1A . . . 1N. As depicted in FIG. 1, the FC I/F 24 of the controller 20 may be connected to the hosts 1A and 1B indirectly, and, specifically, through the FC-SW 4.

As further depicted in FIG. 1, the memory 23 of the disk controller 20 Stores various software modules including an input/output software module (I/O process) 233, which receives requests to the storage system 2 from the hosts 1A . . . 1N, a logical device manager software 231, and a device mapper software 232, which assigns a logical unit number (LUN) to each logical device in such a way that each host is able to access each logical device. The logical device manager 231 creates one or more logical devices from the storage area available on the physical disks 30 and manages the mapping between the logical devices and physical disks 30 using a RAID configuration table.

FIG. 3 shows an exemplary RAID configuration table 400, which is managed by the logical device manager 231. Each row of the RAID configuration table 400 contains information about a respective logical device. For example, as depicted in FIG. 3, column 401 stores the logical device number (LDEV). Each logical device is assigned its own unique identifier number which is referred to herein as a logical device number (LDEV number), for the purpose of linguistic convenience only. The exemplary RAID table depicted in FIG. 3, contains records corresponding to LDEVs 0, 1, . . . , k. The column 402 stores the unique identifiers of each physical disk 30, which, together with other such disks, forms the corresponding logical device. To this end, each disk 30 is provided with a unique identification number (e.g., a disk number), which is stored in the column 402. In the example depicted in FIG. 3, the logical device with LDEV 0 is composed of the disks 1, 2, 3, and 4; the logical device with LDEV 1 is composed of disks 5, 6, 7, and 8; and, finally, the logical device with LDEV k is composed of disks m and m+1.

As depicted in FIG. 3, the RAID configuration table 400 further includes a Column 403 storing RAID level information. Specifically, the disk controller 20 constructs redundant arrays (RAID) from the disks 30. The RAID level information corresponding to each such array is stored in the aforementioned column 403 of the RAID configuration table 400 depicted in FIG. 3. For example, the RAID level value of the devices with LDEV values of 0, 1, and k is 5. The RAID configuration table 400 depicted in FIG. 3 may also contain the stripe size information for each logical device. For example, FIG. 3 shows that the stripe size 404 of the logical devices with LDEV values of 0, 1, and k is 32 KB. In the example depicted in FIG. 3, the RAID level, the number of disks forming a RAID group, and the stripe size are all predetermined fixed values. In another, alternative, embodiment, the aforementioned parameters stored in the RAID configuration table 400 may change time-to-time. Therefore, the description of the embodiment of the RAID configuration table 400 is provided by way of an example only and not by way of a limitation.

Before the storage system 2 is used, a user or an administrator may set the values of various parameters stored in the RAID configuration table 400. Specifically, the users may set and/or appropriately modify each such value including LDEV number, the number of disks in each RAID group, RAID level, and the stripe size(s). Moreover, during the operation of the inventive system, these values may be dynamically adjusted either by the user(s) or by the system itself. After the aforementioned values are properly set, the logical devices are automatically generated when one or more physical disks 30 are installed.

Figure 4:
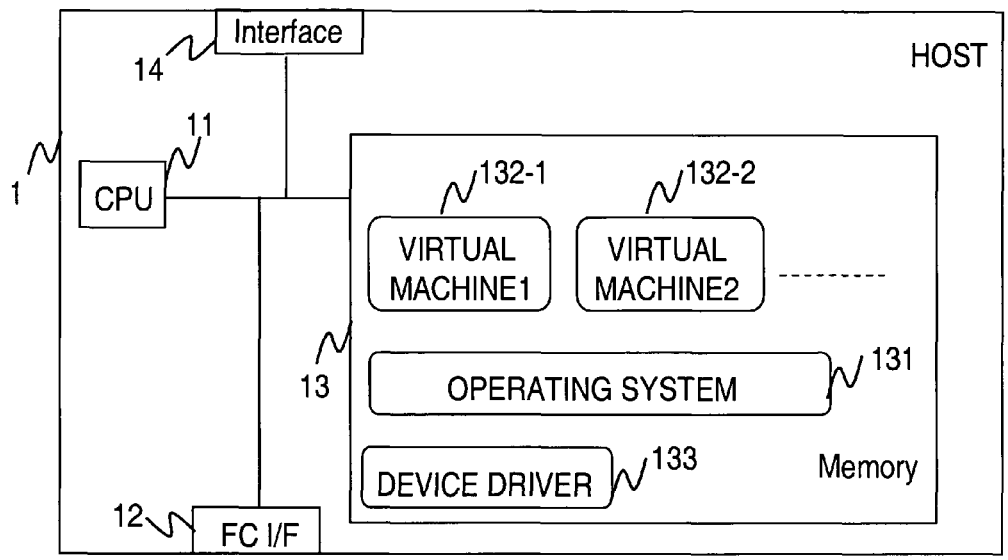
FIG. 4 is a block diagram of a host computer according to an exemplary embodiment of the present invention.

FIG. 4 is a block diagram of a host computer 1 according to an exemplary embodiment of the inventive concept. Each host 1 may include a CPU 11, Fibre Channel interface (FC I/F) 12, a memory 13, and an interface 14. The interface 14 is an example of an interconnect interface, which connects the host 1 to various input/output peripheral devices that may be provided, including a keyboard, a mouse, Cathode Ray Tube (CRT), LCD or plasma display, as well as other similar devices. For example, the interface 14 may be a network interface card (NIC).

The memory 13 of the host 1 stores software various modules executed by the CPU 11. In the example depicted in FIG. 4, the memory 13 stores an operating system software 131, as well as software implementing virtual machines 132 and device drivers 133. The operating system 131 executes a number of software modules and generates one or more virtual machines, and specifically Virtual Machine 1 (132-1), Virtual Machine 2 (132-2), and so on, which hereinafter are also referred to as "virtual machines 132". In the embodiment of the inventive concept, the operating system 131 can generate a significantly large number of virtual machines 132, using any of the techniques presently known to one of ordinary skill in the art or those that may be developed at a future date.

At each point in time, only one of the virtual machines 132 is executing on the host 1. The state of the virtual machine 132 that is being executed is called "active" state. The operating system 131 of the host 1 executes the virtual machines in a time-sharing manner with only one virtual machine active at each point in time. When the operating system is not executing a specific virtual machine, that virtual machine is in "inactive" state, which means that it is not being executed. The aforementioned inactive virtual machine state is also called a "standby" state.

Each virtual machine 132 is assigned a unique identifier. In an embodiment of the inventive system, the scope of this identifier may be limited to the host 1 executing that virtual machine. Hereinafter, this identifier is called a virtual machine ID (VMID). In an exemplary embodiment, the VMID identifiers are unique integer numbers starting from zero. By way of an example, for the host 1A, the value of the VMID corresponding to the Virtual Machine 1 (132-1) is 0, and the VMID value of the Virtual Machine 2 (132-2) is 1, whereas for the host 1B, the VMID assignment may be different. As would be readily apparent to one of ordinary skill in the art, the VMIDs are not limited to integer numbers and may be defined using the ASCII character strings or some other suitable identification scheme currently known or future developed.

In an embodiment of the inventive system, the device driver 133 depicted in FIG. 4 may be a part of the operating system 131. Specifically, the device driver 133 processes input and output requests from the user and the storage system 2. To enable the host 1 to establishing a communication with the storage system 2 via the Fibre Channel, a port login procedure (PLOGI) may be executed. In particular, in accordance with the Fibre Channel protocol, the requester (the host 1) sends a PLOGI frame to the recipient (storage system 2). The PLOGI frame includes the WWN and source identifier (S_ID) of the requester. After receiving the frame, the recipient sends an acknowledgement and the communication link is established.

Figure 5:
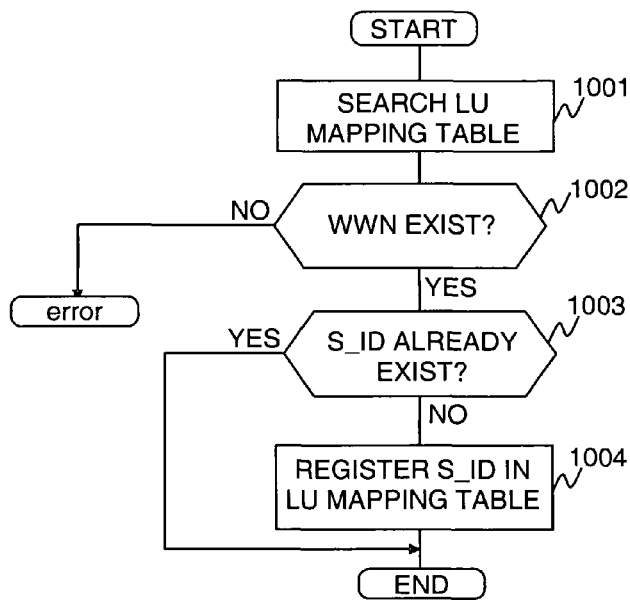
FIG. 5 is a flow chart illustrating operations of the port login process according to an exemplary embodiment of the present invention.

FIG. 5 is a flow chart illustrating an operation of an exemplary PLOGI. First, the host 1 sends a PLOGI request to the storage system 2. The I/O process module 233 of the controller 20 receives the request from the host 1, and invokes a device mapper 232 to execute a process described below. It should be noted that, as explained above, the sent PLOGI request contains a WWN and source identifier (S_ID) of the host 1. In operation 1001 of the aforementioned process, the device mapper 232 uses the received WWN to search a mapping table to locate the record corresponding to host 1. Details of the mapping table are described below. In operation 1002, a check is performed to see if the appropriate host is located. If the host cannot be located (received WWN cannot be found in the mapping table), the process shown in FIG. 5 terminates with an error. On the other hand, if the WWN is located, the process proceeds to operation 1003.

In operation 1003, the device mapper 232 checks the mapping table for records corresponding to the received S_ID. If the mapping table contains an S_ID that corresponds to the WWN 651 (see, for example, an embodiment of the mapping table depicted in FIG. 6) found in operation 1002, the process ends. If not, the process proceeds to operation 1004. In operation 1004, the device mapper 232 adds the combination of the port ID information (S_ID) together with the host identifier (WWN) into the mapping table.

An exemplary mapping table 650 is depicted in FIG. 6. The mapping table 650 maps the logical storage devices to the virtual machines executing on the hosts. In particular, the mapping table 650 contains columns 651 through 657. Column 651 stores the hosts' WWN values and column 652 stores the corresponding S_ID values. As explained above, each host 1 has a Fibre Channel HBA, which has a unique WWN (world wide name) and the source identifier value as the port's identifier. For example, the table shown in FIG. 6 contains records for two hosts, one host with WWN value of "31:02:c2:60:35:01" and the S_ID value of "xxxxxx" and the other host with WWN value of "31:02:c2:26:44:04" and the S_ID value of "yyyyyy".

The mapping table 650 shown in FIG. 6 further includes the identification information for the virtual machine (VMID) 653. This information allows the mapping table to match the virtual machines with their respective hosts. For example, in FIG. 6, the host with WWN value of 31:02:c2:60:35:01 has associated virtual machines with VMID values of 0 and 1. Further, the host with WWN value of 31:02:c2:26:44:04 executes a virtual machine with VMID value of 0. For each virtual machine, the mapping table 650 further specifies whether the virtual machine is executing or not. Specifically, the column 654 stores the state of the virtual machines, indicating which of the virtual machines are active. As previously stated, for each host 1, only one virtual machine will be active at a particular time. Accordingly, in an embodiment of the inventive system, the values stored in the active column 654 may be represented with a number of 0 (for inactive) and 1 (for active).

The mapping table 650 additionally contains information on the storage areas allocated to each virtual machine. In particular, the mapping table 650 contains a logical unit number column 656 and a logical device column 657. In particular, in FIG. 6, the virtual machine with VMID value of 0 executing on the host with WWN value of 31:02:c2:60:35:01 is associated with logical unit numbers 0, 1, . . . , k-1 and the logical devices 1, 2, . . . , m.

The mapping table 650 may be used to provide the host with an access to the storage device allocated to the active virtual machine. By way of an example, when the host with WWN value of 31:02:c2:60:35:01 has the state of a virtual machine with VMID value of 0 set to "active" (the appropriate row of active column 654 contains a value of 1), the host 1 is able to access LDEV 657 1, . . . , m as the logical units whose LUN 656 is 0, . . . , k-1. In the mapping table 650, the logical devices 657 and the logical unit numbers 656 corresponding to the virtual machine with the VMID value of 0 are members of a group of rows labeled 660, while the LUN and LDEV values corresponding to the virtual machine with the VMID value of 1 are in a group labeled 661.

For example, the host 1 can access the logical device with the LDEV value 657 of '2' (the second row of the element 660) as the logical unit with the LUN value of 1 when LUN 656 is 1 and the virtual machine with the VMID 0 is set to active (active 654 is 1). On the other hand, when the virtual machine with the VMID value of 0 is set to "inactive" and the virtual machine with the VMID value of 1 is set to "active", the host 1 is able to accesses the logical device with LDEV value of 8 as the LUN 1.

In an embodiment of the invention, before the virtual machines can be executed in the hosts 1A . . . 1N, users may need to insert the proper values into the columns of the mapping table 650, and specifically the HOST WWN column 651, VMID column 653, LUN column 656, and column LDEV 657. After the appropriate authentication/login procedure, input/output operations are executed using commands specified in the Small Computer System Interface (SCSI) protocol, and specifically the Fibre Channel protocol-Small Computer System Interface (FCP-SCSI) protocol. For example, the commands may include WRITE, READ, INQUIRY, and so on.

When the host 1 issues I/O requests (READ, WRITE, etc.) to a virtual machine, each such I/O request contains the identification information specifying the target virtual device. Because in an exemplary embodiment of the inventive concept, the data transmission between the host 1 and the storage system 2 is conducted in accordance with the Fibre Channel protocol, two types of identification information are included in the command. This identification information includes D_ID number (representing the destination ID and the port ID of the target device) and the Logical Unit Number (LUN). The D_ID number is the parameter specifying one of the target FC I/Fs 24, and it is determined by Fabric (Fibre Channel switch) during the Fabric Login (FLOGI) operation involving the storage system 2 and the respective host. LUN is the identification number specifying one of the devices that can be accessed from the target FC I/F 24 specified by the D_ID.

Initially, all virtual machines are inactive i.e., all rows of the active column 654 of the mapping table 650 contain values of '0'. When each host 1 starts executing one of the virtual machines (after the PLOGI operation), the respective host 1 sends an instruction to the storage system 2 to enable one of the virtual machines to access the logical devices. When the storage system 2 receives this instruction, it changes the corresponding virtual machine state to "active" by changing the corresponding value in the active column 654 of the table 650 to "1".

Figure 7:
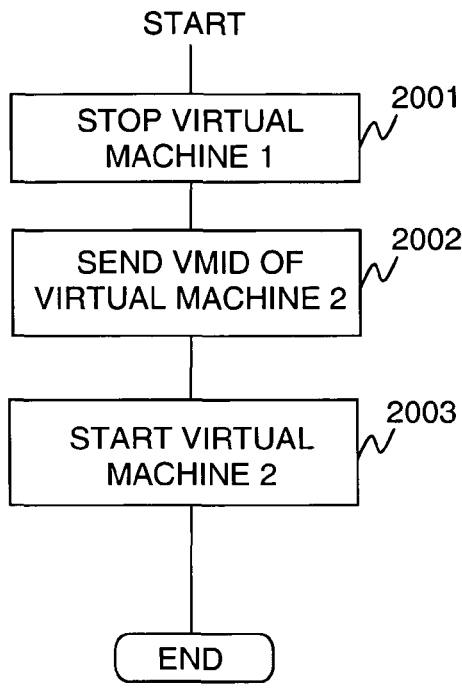
FIG. 7 is a flow chart illustrating the process flow of a host computer switching from running one virtual machine to another according to an exemplary embodiment of the present invention.

Next, when a particular host 1 needs to switch to executing another virtual machine, the host executes a switching process, an exemplary embodiment of which is depicted in FIG. 7. In FIG. 7, when an operating system, such as operating system 131 depicted in FIG. 6, switches the active virtual machine to another virtual machine. By way of an example, the operating system switches from running the virtual machine 132-1 to running the virtual machine 132-2. Accordingly, as depicted in FIG. 7, in operation 2001, the operating system stops the operation of the first virtual machine. In operation 2002, the respective host 1 of the operating system sends an instruction to the storage system 2 indicating that the virtual machine 1 is switched to the virtual machine 2. The instruction includes the VMID of the virtual machine 2. In operation 2003, the virtual machine 2 starts running.

Figure 8:
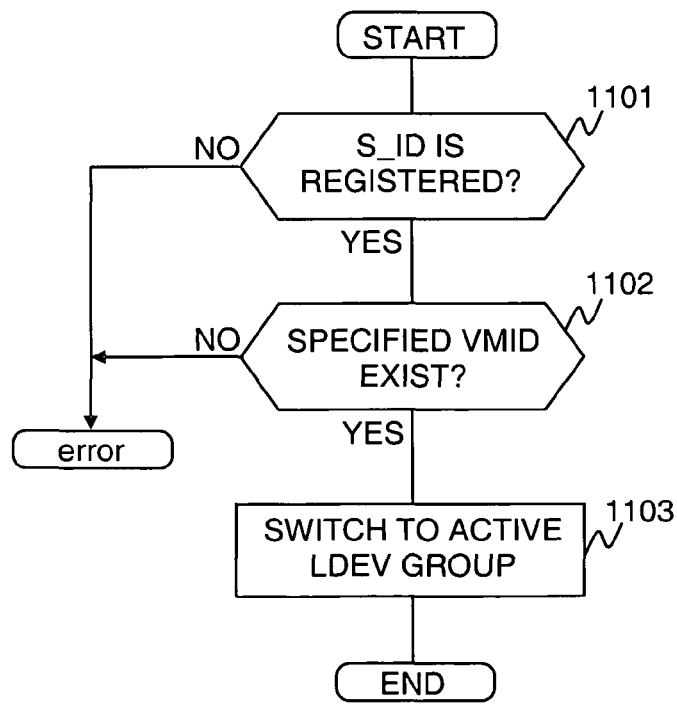
FIG. 8 is a flow chart illustrating the process flow of a storage system switching virtual machines when instructed by a host computer according to an exemplary embodiment of the present invention.

FIG. 8 shows the process flow of the storage system 2 switching virtual machines and corresponding logical storage units when instructed by the host 1. In particular, in operation 1101, the device mapper 232 (depicted in FIG. 1) receives a request to switch, from a host 1. The request may be a proprietary command informing the storage system 2 of the switch. The request includes at least port ID (S_ID) of the host 1 and the VMID information of the virtual machine that is to be executed on the host 1. The device mapper 232 checks the S_ID and determines if the received S_ID is already registered in the LU mapping table 650 (depicted in FIG. 6). If the received S_ID is registered, the process proceeds to operation 1102. If the received S_ID is not registered, the process terminates abnormally i.e., with an error, as depicted in FIG. 8.

In operation 1102, the device mapper 232 checks the VMID information. In particular, the device mapper 232 determines if the specified VMID exists for the S_ID in the mapping table 650. That is, the device mapper 232 checks whether the virtual machine with the specified VMID is registered to the host 1 with the specified S_ID. If the device mapper 232 determines that the virtual machine with the specified VMID exists for the host 1 with the specified S_ID, the process proceeds to operation 1103. If not, the process terminates abnormally, with an error as depicted in FIG. 8.

In operation 1103, the device mapper 232 "turns off" the logical devices that are currently accessible to the host 1. That is, the device mapper 232 releases the logical devices that correspond to the currently executed virtual machine by the host 1. Accordingly, the host 1 can no longer access the logical devices of the currently executing virtual machine. That is, the logical devices of the currently executing virtual machines become invisible to the host 1. The device mapper 232 also "turns on" the logical devices that are associated with the combination of the specified VMID and S_ID (included in the request from host 1). That is, the device mapper 232 allocates or assigns the logical storage devices associated with the VMID specified in the request. Accordingly, the host 1 can now access the logical storage devices of the virtual machine to be executed.

The logical storage devices are "turned on" and "off" by manipulating values in the active column 654 of the mapping table 650 depicted in FIG. 6. For example, in FIG. 6, the host computer, whose S_ID 652 is 'xxxxxx', has an active virtual machine with VMID 653 value 0 (the first row 660) i.e., the virtual machine with VMID 653 '0' is labeled as active ('1') in the active column 654 and an inactive virtual machine with VMID 653 value 1 (the second row 661) i.e., the virtual machine with VMID 653 '1' is labeled as inactive ('0') in the active column 654. When the host 1 issues the request to activate the virtual machine with VMID 653 '1', the request from the host 1 to the storage system 2 contains the S_ID 'xxxxxx' and VMID '1'. When the storage system 2 receives this request, the device mapper 232 manipulates the active column 654. Specifically, the virtual machine with VMID '0' of the S_ID 652 xxxxxx is labeled with '0' in the active column 654 and the virtual machine with VMID '1' of the S_ID 652 xxxxxx is labeled with '1'.

As a result, the host 1 can access the storage devices allocated to the virtual machine currently being executed, as explained with reference to FIG. 9, and the host 1 only needs to be connected to the logical devices of one virtual machine at each point in time. Accordingly, a significantly higher number of virtual machines may be executed by a single host 1.

Figure 9:
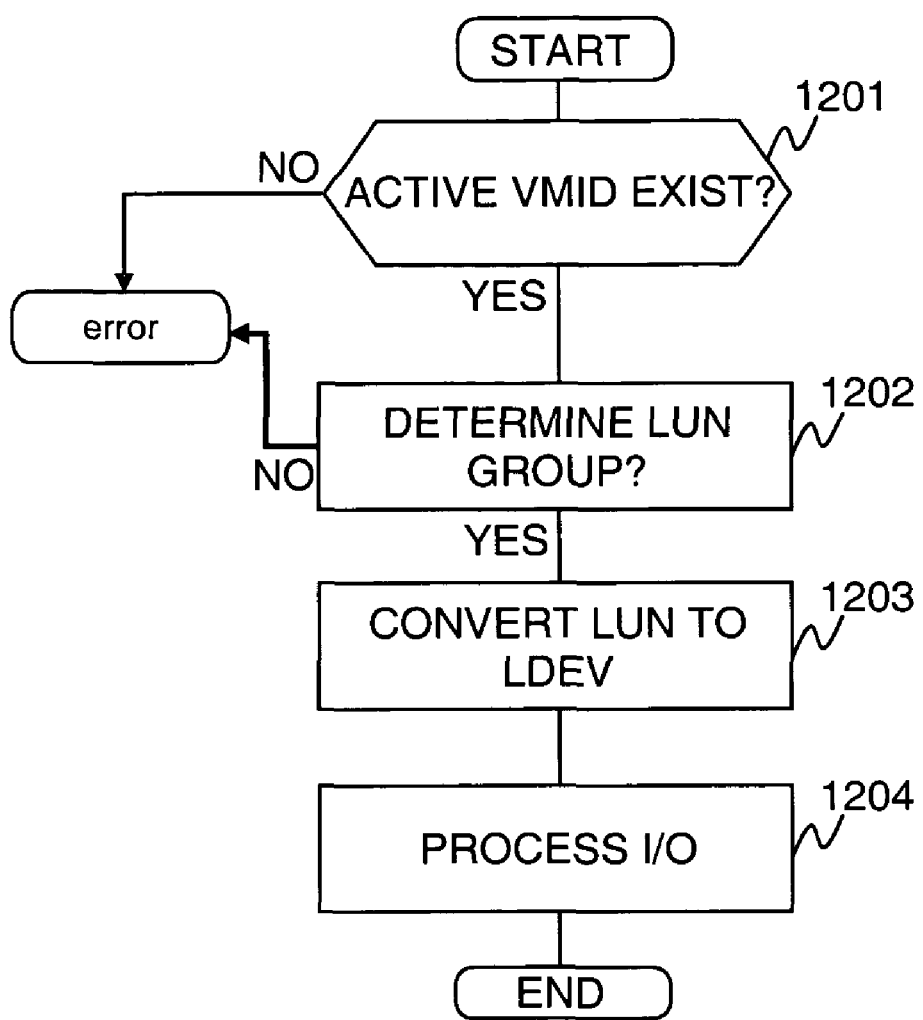
FIG. 9 is a flow chart illustrating the process flow of an input/output process according to an exemplary embodiment of the present invention.

FIG. 9 illustrates a process flow of the I/O process 233 when the I/O request (such as READ, WRITE command) is received. The process starts with the I/O process 233 of the storage system 2 (as depicted in FIG. 1) receiving an I/O request from the host 1. In operation 1201, the process 233 checks the port ID (S_ID) included in the I/O request and searches the mapping table 650 for the specified port ID (S_ID). If the port ID is not found, the process ends with an error. Next, if the port ID (S_ID) is found in the mapping table 650, the process 233 checks to find the active virtual machine. In particular, the process 233 tries to locate a '1' in the active column 654 associated with the found port ID (S_ID). If '1' in the active column 654 is found i.e., a virtual machine with VMID 653 and an active status '1' is found, the process proceeds to operation 1202. Otherwise, the process terminates abnormally with an error as depicted in FIG. 9.

In operation 1202, the process determines if the logical unit number (LUN) specified in the I/O request exists in the logical units of the devices of the active virtual machine. If the LUN exists, the process proceeds to operation 1203. Otherwise, the process ends abnormally with an error, as depicted in FIG. 9. In operation 1203, the LUN information is converted into the logical device LDEV. By way of an example, if LUN in the I/O request is 1, the logical device number is determined to be 2 based on the exemplary mapping table 650 depicted in FIG. 6. In operation 1204 of FIG. 9, the I/O request is processed i.e., the read, write, or other command is processed.

Many variations are possible and the above described embodiment is provided by way of an example only and not by way of limitation. For example, all the logical devices (LDEVS) that are assigned to a particular virtual machine cannot be used by other virtual machines because each virtual machine is a logically separate machine. However, by way of variation, the users may want the virtual machines to share some of the logical devices. Accordingly, by way of an example, a number of logical unit numbers (LUNs) may be assigned to the same logical device. For example, in the mapping table 650 depicted in FIG. 6, the logical device with LDEV 657 '1' can be accessed as a logical unit number 0 (LUN 656 '0') from both virtual machines of the host 1 (whose S_ID is xxxxxx) i.e., the virtual machine with VMID 653 '0'and the virtual machine with VMID 653 '1' can access the LDEV 657 '1' as both have LUN 656 '0'.

By way of another exemplary variation, more than one storage systems and multiple controllers may be provided. An exemplary information system having multiple controllers and storage systems is explained below with reference to another exemplary embodiment of the inventive concept.

Figure 10:
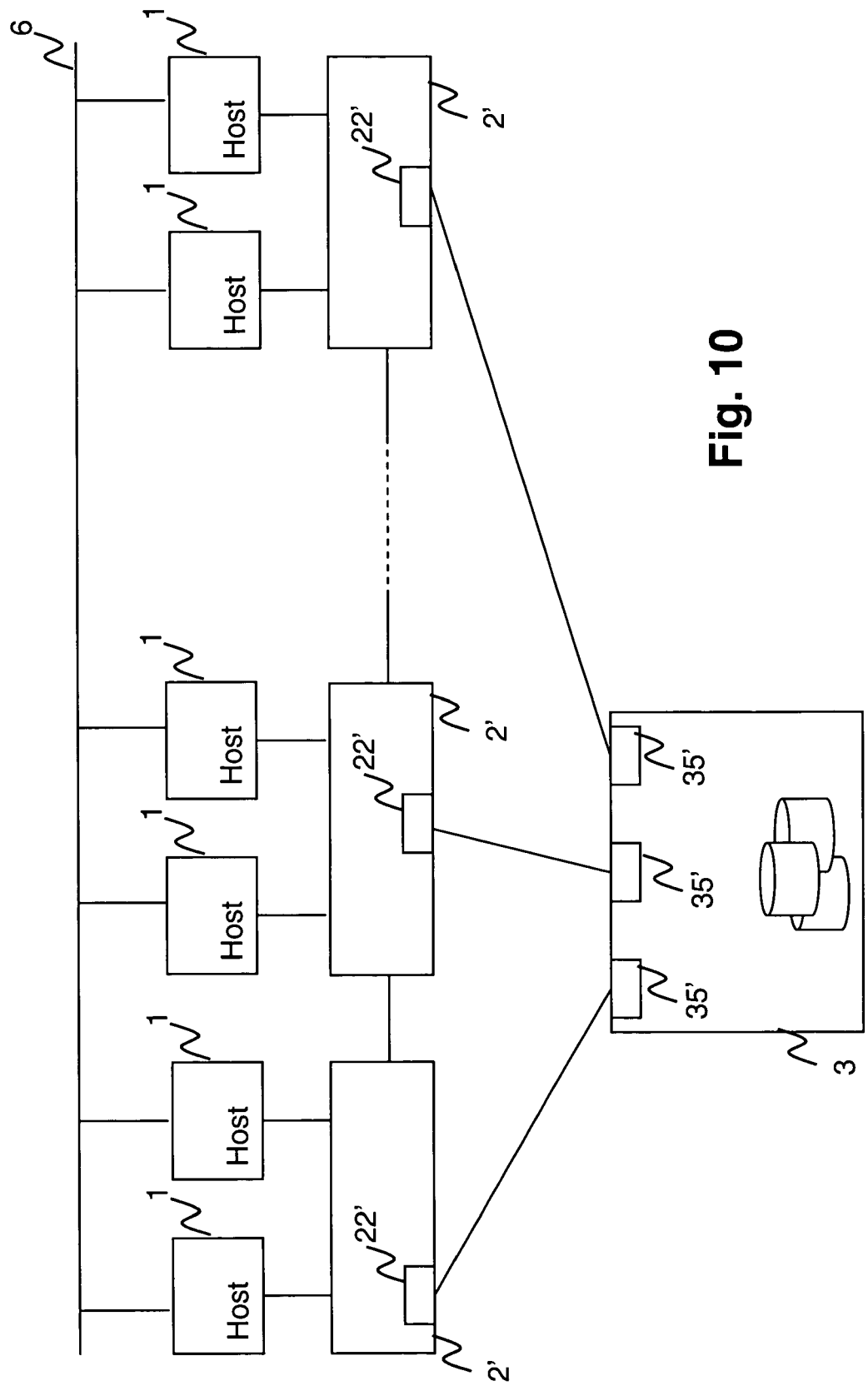
FIG. 10 is a block diagram illustrating exemplary structure of the information system according to another exemplary embodiment of the present invention.

FIG. 10 is a block diagram illustrating exemplary structure of the information system according to another exemplary embodiment of the inventive concept. In FIG. 10 multiple host computers 1 are depicted. These hosts 1 are analogous to the hosts explained above with reference to FIG. 1. In this exemplary information system, the hosts 1 are interconnected using LAN (Ethernet) 6 for example. Moreover, these hosts 1 are interconnected with one or more storage systems 3 (depicted in FIG. 10 as the storage system 3 for ease of illustration only). By way of an example, these storage systems 3 may be Just a Bunch of Disk (JBOD) and/or disk array having RAID capability. Each of the storage systems 3 contains a Fibre channel interface (FC I/F) 35' connecting the respective storage system to a respective controller 2'. As depicted in FIG. 10, a number of SAN controllers 2'A, 2'B, . . . , 2'N are provided (collectively referred to as controllers 2' for the sake of linguistic convenience only). These controllers 2' interconnect hosts 1 and storage systems 3. Each controller 2' has a backend interface 22' connecting the controller to the respective storage system 3. The hosts 1, the controllers 2', and the storage systems 3 may be interconnected using Fibre Channel cable and/or Ethernet.

Figures 11, 12:
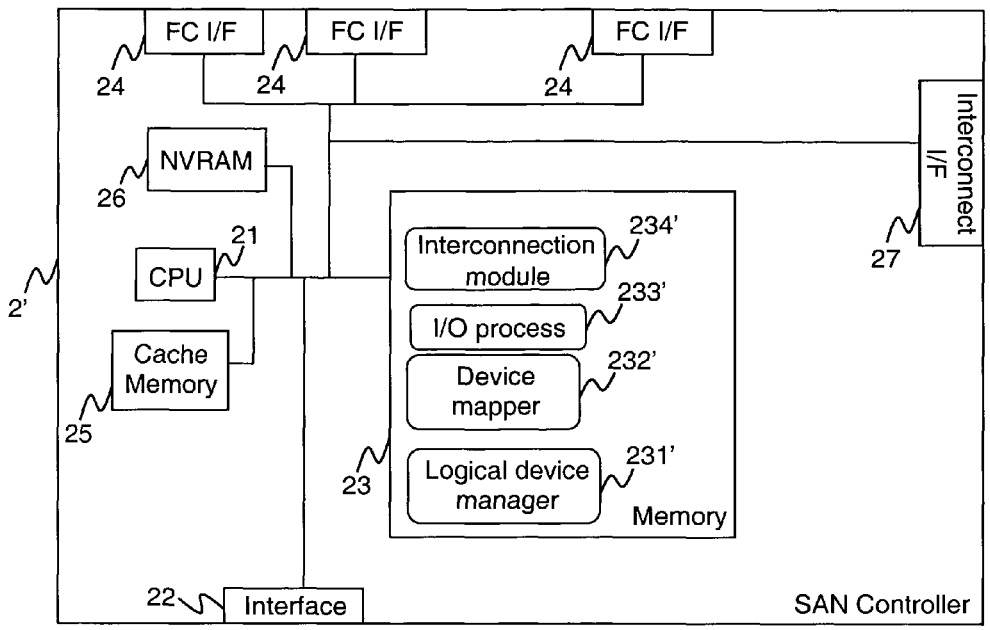
FIG. 11 is a block diagram illustrating exemplary structure of a SAN controller according to another exemplary embodiment of the present invention.
FIG. 12 illustrates a structure of a logical device (LDEV) configuration table according to another exemplary embodiment of the present invention.

FIG. 11 depicts an exemplary structure of a SAN controller 2' according to an exemplary embodiment of the inventive concept. The SAN controller 2' contains analogous functional modules to the disk controller 20 depicted in FIG. 1. As illustrated in FIG. 11, the SAN controller 2' contains a CPU 21, at least one backend interface 22, a memory 23, a cache memory 25, a NVRAM 26, at least one Fibre channel interface (FC I/F) 24, and at least one interconnect I/F 27. The interconnect I/F 27 may be used for communicating with other SAN controllers 2'. By way of an example, the interconnect I/F 27 may be an Ethernet network interface card (NIC). Alternatively, or in addition, some or all of the SAN controllers 2' may be connected to each other using the FC I/Fs 24 or backend interfaces 22.

As depicted in FIG. 11, the memory 23 of the exemplary SAN controller 2' has a logical device manager 231', an interconnection module 234' (explained in greater detail below), an I/O process 233', and a device mapper 232'. In this exemplary embodiment, however, the logical device manager 231' does not create RAID disk groups. Instead, each storage system 3 may create RAID disk group within its respective storage system 3. Each storage system 3 maintains a mapping table such as the mapping table 650 depicted in FIG. 6.

The logical device manager 231' of the SAN controller manages only the devices that each storage system 3 shows as logical devices. In particular, the logical device manager 231' of each SAN controller 2' maintains a logical device (LDEV) configuration table 400 depicted in FIG. 12.

As depicted in FIG. 12, the LDEV configuration table 400' contains LDEV 401' column indicating assigned LDEV numbers of the devices in the storage systems 3. Specifically, the SAN controllers 2' discover devices in the storage systems 3 and assign LDEV number to each discovered device. The LDEV configuration table 400' further contains a world wide name (WWN) column 402' identifying the FC I/F 35' of the storage system 3 and a logical unit number (LUN) column 403' identifying the LUN of the devices defined in the LDEV 401'. That is, each device is assigned an entry in the LDEV column as well as entries in the WWN and LUN columns, which collectively identify the corresponding device in the storage systems 3. Accordingly, in the exemplary LDEV configuration table 400' depicted in FIG. 12, the storage device with LDEV of 301 corresponds to the assigned information of WWN 402' (10:04:e2:04:48:39) and LUN 403' (0). Using the LDEV configuration table 400', SAN controllers 2' manage logical devices of the storage systems 3. By way of a variation, in some configurations of a storage system 3, a device may be accessed from a number of access paths, and accordingly, the SAN controller records a plurality of combinations of WWN 402' and LUN 403'.

The SAN controller 2' works as a host computer towards the storage systems 3. The SAN controller 2' issues I/O requests to each of the devices in the storage systems 3 by designating port ID (alternatives of WWN) of the storage system 3 and LUN.

The LDEV configuration table 400' depicted in FIG. 12 is used when a SAN controller 2' issues an I/O request to the storage system 3 e.g., when it executes the operation depicted in FIG. 9. The WWN column 402' and LUN column 403' in the LDEV configuration table 400' contain the identification information for the logical devices in the storage system 3, and each of the logical devices in the storage system 3 is uniquely identified by these identification information. At operation 1203 depicted in FIG. 9, LUN is converted to the LDEV number based on the table 400'. At operation 1204, the process converts the LDEV number into the combination of WWN number of column 402' and LUN number of column 403', and issues the I/O request to the storage system 3 using the aforesaid information.

Figure 13:
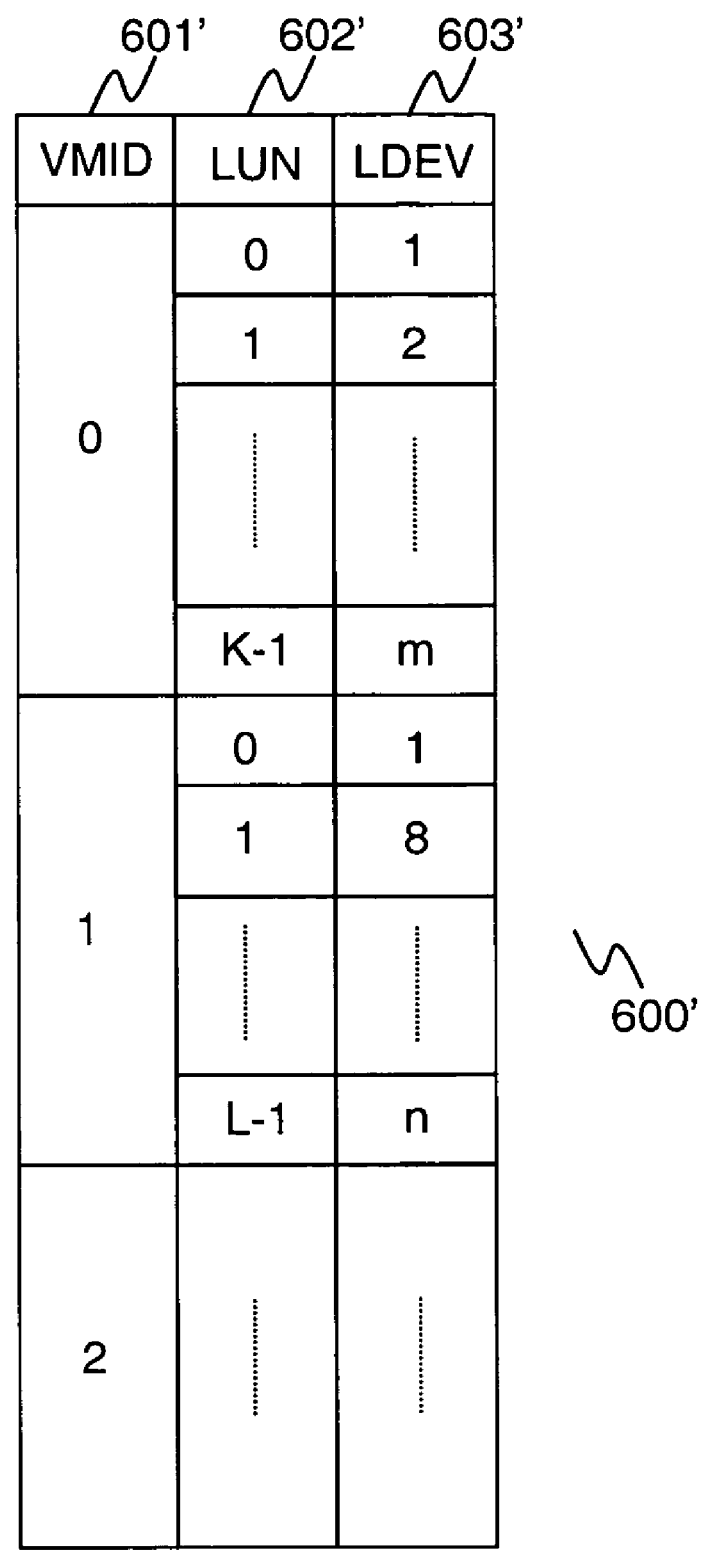

The interconnection modules 234' of the SAN controllers 2' communicate with each other. In particular, one of the interconnection modules 234' is made a master interconnection module. The master-interconnection module also maintains the LDEV configuration table 400' and a global LU mapping table 600'. An exemplary global LU mapping table 600' is depicted in FIG. 13. In FIG. 13, each virtual machine has a global VMID 601' such as VMID 0, 1, or 2. That is, no matter how many hosts 1 are in the information system according to this exemplary embodiment of the inventive concept, each virtual machine will have only one unique VMID. As depicted in FIG. 13, each virtual machine has a unique VMID 601' and corresponding LUNs 602' and LDEVs 603'. For example, the virtual machine with VMID 601' has LUNs 602'0, 1, . . . , k-1, and LDEVs 603' 1, 2, . . . , m. The master interconnection module uses these tables to send part of the information to other interconnection modules 234' in accordance with a request from other interconnection modules 234'. Other interconnection modules can cache this information and use it as needed. Users or the hosts 1 in the exemplary system instruct the master SAN controller 2' to register the set of VMID, LUNs, and LDEVs that the virtual machine should use.

An exemplary host 1 of this exemplary embodiment of the inventive concept is depicted in FIG. 14. The exemplary host 1 has a CPU 11, an FC I/F 12, a memory 13, and an interface 14. The memory 13 contains operating system 131', virtual machine 1 132-1', virtual machine 2 132-2', and a device driver 133'. These exemplary features of the memory 13 are somewhat analogous to the exemplary features of the host 1 explained with reference to FIG. 4. However, the memory 13 also contains a workload monitor 134' and a global virtual machine manager 135'.

As explained above, in this exemplary embodiment, each virtual machine has a unique identification number (VMID) within the system and not within the host 1. Therefore, each virtual machine can run on arbitrary hosts 1. Accordingly, the host 1 has the workload monitor 134' to observe the workload of its host and the global VM manager 135' that communicates with other global VM managers 135' of other hosts 1 to determine which host 1 should execute each of the requested virtual machine 132. The global VM manager 135' determines that a virtual machine should run on a host 1 having the lowest workload. The global VM manager 135' also maintains the global LU mapping table 600, which is used for instructing a SAN controller 2' to switch the logical devices.

An exemplary operation sequence of a PLOGI registration process as well as a process for handling requests from a host 1 is explained with reference to FIG. 16. Initially, each SAN controller 2' maintains an LU mapping table such as table 650' depicted in FIG. 15. The table 650' illustrated in FIG. 15 contains host WWN column 651', S_ID column 652', VMID column 653', status of the virtual machine (active/inactive) column 654', LUN column 656', and LDEV column 657'. These data fields were explained in greater detail with respect to FIG. 6. Accordingly, their descriptions are herein omitted.

In an exemplary embodiment of the inventive concept, each SAN controller maintains its own LU mapping table 650'. The master SAN controller collects all LU mapping tables 650' from all the SAN controllers.

Initially, no information is stored in the LU mapping table 650'. The PLOGI process begins with operation 1001', whereupon the LU mapping table 650' of the SAN controller is searched for the records with requisite values of WWN and S_ID. In operation 1002', if the requisite WWN and S_ID exist in the LU mapping table 650', the process terminates. If the requisite records do not exist, the process proceeds to operation 1003', whereupon the device mapper 232' (depicted in FIG. 11) registers the combinations of the WWN and the port ID information that come with the PLOGI request into the host WWN 651' and the S_ID 652' fields in the LU mapping table 650': However, the relationship among the VMID, the LUN, and the LDEV is not registered in this operation. In operation 1004', the WWN and S_ID information is sent to the master SAN controller 2'.

Figure 17:
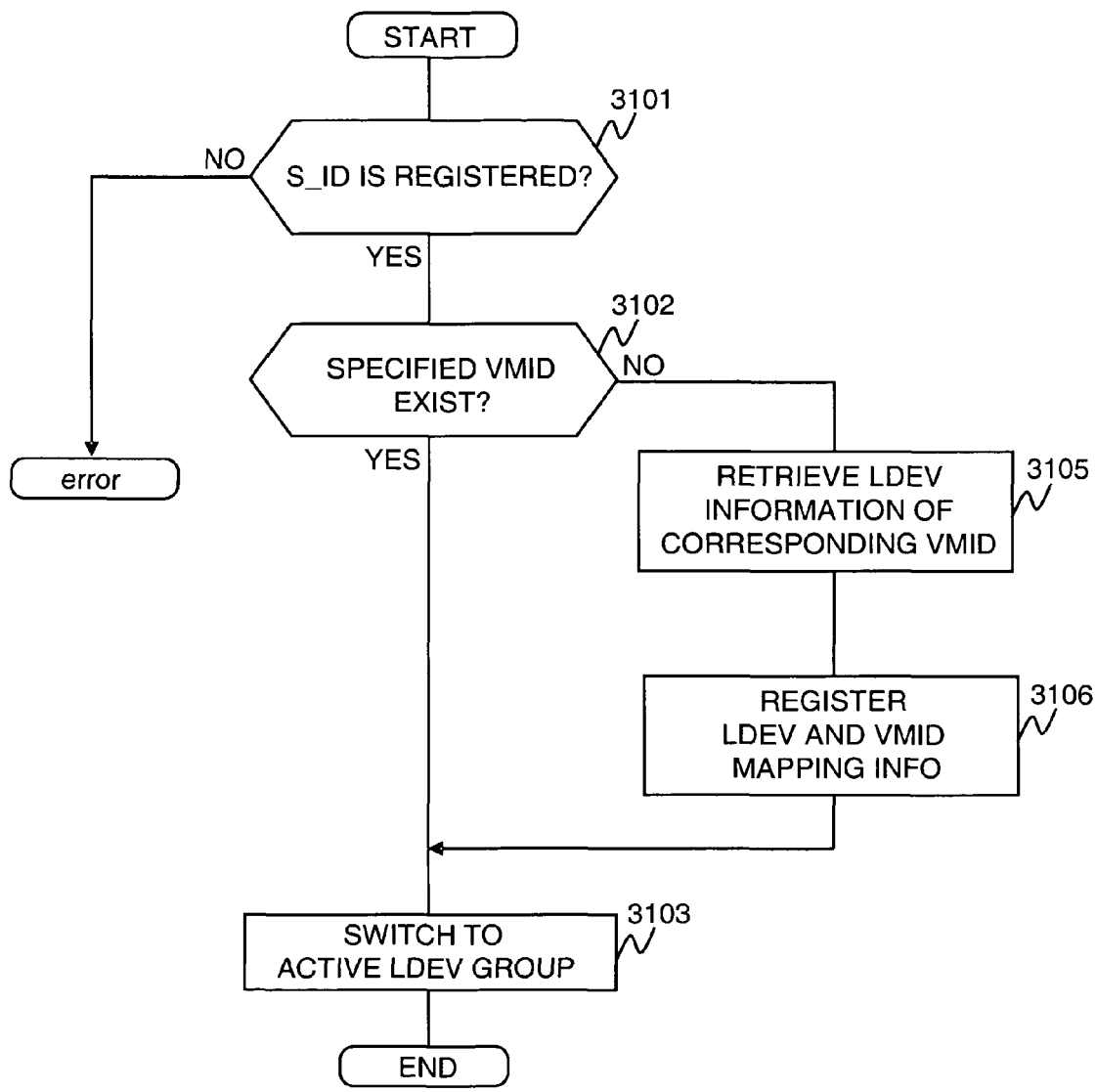
FIG. 17 is a flow chart illustrating the process flow of switching from one virtual machine to another according to another exemplary embodiment of the present invention.

The process flow of switching logical devices for executing different virtual machines is explained below with reference to FIG. 17. Before a host computer 1 starts to execute a virtual machine, the host issues a request to activate or to switch to the logical devices of the virtual machine to be executed. The request may contain a port ID (S_ID) and VMID information. In operation 3101, the device mapper 232' of a SAN controller 2' receives the request from host 1. The device mapper 232' checks the S_ID and determines if the received S_ID is registered in a mapping table. If it is registered, the process proceeds to operation 3102. Otherwise, the process terminates abnormally with an error, as depicted in FIG. 17.

In operation 3102, the device mapper 232' checks the VMID information and judges if the combination of the specified VMID and S_ID (that is checked at step 3101) exist in the mapping table. If they exist, process proceeds to operation 3103. If not, the process proceeds to operation 3105.

That is, if in operation 3102, no combination of the specified VMID and S_ID is found (the specified VMID does not exist in the mapping table), the device mapper 232' sends a request to the master SAN controller 2' to retrieve the information about the logical devices that the virtual machine (specified with VMID) will use, in operation 3105. After receiving the information about the logical devices, the process proceeds to operation 3106. In operation 3106, the device mapper 232' registers the retrieved information into the corresponding row of the mapping table, and proceeds to operation 3103 to execute the switch.

In operation 3103, the device mapper 232' turns the logical devices that are currently accessed by the host 1 into an unmapped state (releases these logical devices) and assigns the logical devices that are associated with the combination of the specified VMID and S_ID (included in the request from the host 1) into the mapped state (assigns these logical devices to the host 1) so that the host 1 can access these logical devices. Subsequently, the device mapper 232' sends the current LU mapping table 550' to the master SAN controller 2'.

Upon the completion of the PLOGI process depicted in FIG. 16, the inventive system executes the process of FIG. 17 in an appropriate SAN controller. At operations 3105 and 3106 of that process, the master SAN controller sends the information indicative of the relationship among VMID, LUNs, and LDEVs that are registered in the global LU mapping table 650' to the SAN controller where the process of FIG. 17 is executed.

The above and other features of the inventive concept including various novel operations and various novel parts and elements have been particularly described with reference to the accompanying drawings and pointed out in the claims. It will be understood that the particular process and construction of parts embodying the inventive concept is shown by way of illustration only and not as a limitation of the inventive concept. The principles and features of this inventive concept may be employed singly, or in any combination, in varied and numerous embodiments without departing from the spirit and scope of the inventive concept as defined by the appended claims.

What is claimed is:

1. A system for allocating resources in a virtual execution environment, the system comprising:
   a host computer operable to execute a plurality of virtual machines;
   a switch; and
   a storage system connected to the host computer via the switch, the storage system comprising:
      system resources comprising a plurality of resource groups; and
      a resource controller operable to associate a first resource group of the plurality of resource groups to a first virtual machine executing on the host computer,
   wherein the first resource group comprises a RAID disk group or Just a Bunch of Disks (JBOD);
   wherein the host computer comprises an operating system executing the plurality of virtual machines and wherein, when the operating system switches execution from the first virtual machine to a second virtual machine, the host computer informs the resource controller of the execution switch and the resource controller releases the first resource group assigned to the first virtual machine and assigns a second resource group to the second virtual machine.

2. The system of claim 1, wherein a state of the first virtual machine changes to an inactive state, and wherein the first virtual machine is in the inactive state when the first virtual machine is not executing or in a standby state.

3. The system of claim 1, wherein each of the plurality of virtual machines executes on the host computer in a time-sharing manner.

4. The system of claim 1, wherein the system resources comprise at least one storage device.

5. The system of claim 4, further comprising a logical device manager allocating at least one logical resource unit from at least one physical storage unit.

6. The system of claim 1, wherein each of the plurality of resource groups comprises at least one logical resource unit.

7. The system of claim 1, wherein the host computer comprises at least one central processing unit and a memory and wherein each of the at least one central processing unit executes a respective virtual machine.

8. A system for allocating resources in a virtual environment comprising:
  a host computer executing a plurality of virtual machines in a time-sharing manner;
  a switch;
  a storage system connected to the host computer via the switch, the storage system comprising:
  a storage device;
  a controller configured to divide the storage device into a plurality of logical storage areas, and, when a state of a first virtual machine switches to an active state, the controller assigns a first logical storage area to the first virtual machine;
  wherein the host computer comprises an operating system executing the plurality of virtual machines and wherein, when the operating system switches execution from the first virtual machine to a second virtual machine, the host computer informs the controller of the execution switch and the controller releases the first logical storage area assigned to the first virtual machine and assigns a second logical storage area to the second virtual machine;
  wherein the first logical storage area comprises a RAID disk group or Just a Bunch of Disks (JBOD).

9. The system according to claim 8, wherein at least a portion of the second logical storage area comprises a portion of the first logical storage area that was assigned to the first virtual machine and was released.

10. The system according to claim 8, wherein, when one of the plurality of virtual machines is in an active state, the other virtual machines executed by the host computer are in an inactive state.

11. The system according to claim 8, wherein the releasing comprises logically unmapping the logical storage area assigned to the first virtual machine and disabling the host computer from accessing the first logical storage area.

12. The system according to claim 11, wherein, when the host computer is disabled from accessing the first logical storage area, the first logical storage area is invisible to the host computer.

13. The system according to claim 11, wherein the controller manages allocation of the plurality of logical storage areas by using a mapping table comprising an identifier for the host computer, a virtual machine identifier and a state identifier for each of the plurality of virtual machines, and for each of the plurality of virtual machines at least one identifier of a corresponding logical storage area, and wherein, when the execution switch is executed, the state identifier of the first virtual machine and the state identifier of the second virtual machine are changed.

14. The system according to claim 11, wherein the execution switch is executed by manipulating a value of a flag stored in a mapping table in a memory of the controller.

15. The system according to claim 14, wherein the mapping table comprises the flag indicating active state of virtual machines assigned to the host computer, a port identification corresponding to the host computer, a virtual machine identification number for each of the plurality of virtual machines, a logical unit number and a logical device number.

16. The system according to claim 8, further comprising a plurality of host computers, a plurality of storage devices, and a plurality of controllers connecting the plurality of host computers to the plurality of storage devices.

17. The system according to claim 16, wherein the plurality of host computers communicate with each other to determine a host with lowest processing load, and wherein next virtual machine to be executed is executed by the host with lowest load and wherein, each virtual machine has a unique identifier.

18. The system according to claim 16, wherein, prior to executing the first virtual machine, the controller registers each of the hosts and respective virtual machines that correspond to a respective host into a mapping table used to allocate the logical storage areas, and wherein each virtual machine has an identifier unique to the respective host.

19. A system for allocating resources in a virtual environment comprising:
  a plurality of host computers operable to execute a plurality of virtual machines, each of the host computers executes the plurality of virtual machines in a time-sharing manner;
  a switch; and
  a storage system connected to the host computers via the switch, the storage system comprising:
    a storage device divided into a plurality of logical storage areas; and
    a controller operable to assign a first logical storage area to a first virtual machine being executed by a host computer and manage the assignment via a mapping table,
  wherein each of the host computers comprise an operating system executing the plurality of virtual machines and wherein, when the operating system switches execution from the first virtual machine to a second virtual machine, the host computer informs the controller of the execution switch and the controller releases the first logical storage area assigned to the first virtual machine and assigns a second logical storage area to the second virtual machine:
  wherein the first logical storage area comprises a RAID disk group or Just a Bunch of Disks (JBOD).

20. The system according to claim 19, wherein at least two of the host computers are configured to execute same one of the plurality of virtual machines.

21. The system according to claim 19, wherein, when the controller releases the first logical storage area assigned to the first virtual machine, the released first logical storage area becomes invisible to the respective computer.

22. The system according to claim 19, wherein when a virtual machine to be executed on a host from the plurality of hosts is not found in the mapping table, the controller adds the virtual machine to the mapping table associating the virtual machine with the host.

23. A method for allocating resources in a virtual execution environment comprising:

executing a first virtual machine by a host computer;

switching, by the host computer, to execute a second virtual machine;

informing a resource controller, by the host computer, of the execution switch;

releasing, by the resource controller, a first resource group assigned to the first virtual machine; and assigning, by the resource controller, a second resource group to the second virtual machine;

wherein the second resource group comprises a RAID disk group or Just a Bunch of Disks (JBOD);

wherein the resource controller is located within a storage system, the storage system being connected to the host computer via a switch.

24. The method according to claim 23, wherein the resource controller registers the host computer and the first and second virtual machines and respective resource groups into a mapping table.

25. The method according to claim 23, wherein an assignment of resource groups to one or more virtual machines is user-specified.

26. The method according to claim 23, wherein the switching comprises a request to the resource controller by the host computer, the request comprising an identifier of the host computer, a port number identifier, and an identifier of the second virtual machine and wherein, when the host computer identifier is located by the port number identifier is not located by the controller in the mapping table, the controller registers the port number identifier to correspond to the host computer identifier.

27. The method according to claim 23, where the resource group comprises a storage system hardware resource.

* * * * *